United States Patent [19]

Rattan et al.

[11] Patent Number: 4,698,770
[45] Date of Patent: Oct. 6, 1987

[54] COMPUTER CONTROLLED VIDEO DEVICE AND SLIDE PROJECTOR INTERFACE ARRANGEMENT

[75] Inventors: Dev R. Rattan, Chicago; Robert R. Parker, Wheeling, both of Ill.

[73] Assignee: Bell & Howell Company, Chicago, Ill.

[21] Appl. No.: 570,466

[22] Filed: Jan. 13, 1984

[51] Int. Cl.[4] .......................... G06F 3/00; G06F 3/14; G06F 9/00
[52] U.S. Cl. ..................................... 364/900; 358/903
[58] Field of Search ... 364/200 MS File, 900 MS File, 364/514, 138, 183, 130, 518; 358/903, 335; 360/33.1

[56] References Cited

U.S. PATENT DOCUMENTS

| | | | |
|---|---|---|---|
| 3,970,997 | 7/1976 | Daly et al. | 364/200 |
| 4,001,790 | 1/1977 | Barlow | 364/200 |
| 4,006,466 | 2/1977 | Patterson et al. | 364/200 |
| 4,079,452 | 3/1978 | Larson et al. | 364/200 |
| 4,100,601 | 7/1978 | Kaufman et al. | 364/200 |
| 4,133,013 | 1/1979 | Fisher | 360/92 |
| 4,172,280 | 10/1979 | Spiesman | 364/900 |
| 4,212,080 | 7/1980 | Milliken | 364/900 |
| 4,420,234 | 12/1983 | Dolejsi et al. | 353/122 |
| 4,437,169 | 3/1984 | Bertenshaw et al. | 364/900 |
| 4,452,518 | 6/1984 | Di Gianfilippo et al. | 353/25 |
| 4,470,675 | 9/1984 | Di Gianfilippo et al. | 353/15 |
| 4,531,182 | 7/1985 | Hyatt | 364/131 |

Primary Examiner—Archie E. Williams, Jr.
Assistant Examiner—William G. Niessen
Attorney, Agent, or Firm—Roger M. Fitzgerald; James V. Lapacek; Joan Pennington

[57] ABSTRACT

An intelligent interface arrangement is provided for controlling operation of peripheral devices including a video device and a random access slide projector from a computer. The computer via the interface arrangement also controls the audio and video inputs to the system monitor for the selection of either audio channel from the video device, no audio, or mixed audio. The video control includes selection of video from the video device or computer. The computer addresses the interface arrangement with a predetermined unique address code. The address also includes the category of video device to be controlled. Each command sequence from the computer to the interface arrangement includes a start of command byte, one or more command bytes and an end of command byte. Each communication command sequence also includes a video-audio device command byte for selection of desired audio and video modes. The video-audio device command byte in a preferred arrangement also includes a bit of information for designating the type of video device within a category. The interface arrangement senses the status of the connected video device and slide projector including video device and slide projector connection status, the type of video device connected, power-on status, and operational mode status. The interface arrangement responds to status request by the computer to supply the status of each peripheral and the internal status of the interface components. The interface arrangement also communicates various error and status messages including acknowledgement of received command sequences and for error in agreement between the requested and connected perpheral device.

18 Claims, 13 Drawing Figures

COMPUTER CONTROLLED VIDEO DEVICE AND SLIDE PROJECTOR INTERFACE ARRANGEMENT

BACKGROUND OF THE INVENTION

1. Field of the Invention

The present invention relates generally to the field of intelligent interface arrangements for the control of peripherals by a computer, the peripherals including for example video cassette recorders, video disc players and random access slide projectors.

2. Description of the Prior Art

Various control arrangements have been proposed by the prior art including peripheral device controllers for computers as well as intelligent peripheral devices. The peripheral devices include video cassette recorders, video disc players and random access slide projectors. For example, a video cassette recorder interface control arrangement is disclosed in U.S. Pat. No. 4,578,718 issued Mar. 25, 1986 by R. R. Parker and D. R. Rattan. Further, interactive apparatus and methods including the control of peripheral devices are disclosed in U.S. Pat. No. 4,576,578 issued Mar. 18, 1986 by R. R. Parker and D. J. DiGianfilippo and U.S. application Ser. No. 481,090 filed on Mar. 31, 1983 by R. J. Spiece.

While the arrangements of the prior art are generally suitable for their intended use, it would be desirable to provide an intelligent interface arrangement for controlling operation of a video device and a random access slide projector from a computer, the video devices including for example video disc players and video cassette recorders.

SUMMARY OF THE INVENTION

Accordingly, it is a principal object of the present invention to provide an intelligent interface arrangement for controlling operation of a video device and a random access slide projector from a computer.

It is another object of the present invention to provide an intelligent interface arrangement for controlling operation of various peripherals from a computer; the computer issuing high level commands in a format that is identical for similar functions of all the devices that are capable of being connected to the interface arrangement.

It is yet another object of the present invention to provide an interface control arrangement for controlling a random access slide projector and one of a number of video cassette recorders or video disc players from a computer to control the operational control of the peripheral devices and to provide audio and video selection arrangements.

It is a further object of the present invention to provide an intelligent interface arrangement for peripheral devices of various categories and different device types within each category, the interface arrangement sensing when a device is connected and what type of device is connected in each category.

Briefly, these and other objects of the present invention are efficiently achieved by providing an intelligent interface arrangement for controlling operation of peripheral devices including a video device and a random access slide projector from a computer. The video devices that are controlled include for example one or more types of video cassette recorders and one or more types of video disc players. The computer via the interface arrangement also controls the audio and video inputs to the system monitor. The audio control includes selection of either audio channel from the video device, no audio, or mixed audio from both audio channels or the video device. The video control includes selection of either video from the video device or computer. The computer issues commands in response to either user inputs via keyboard or program control. The computer addresses the interface arrangement with a predetermined unique address code for transfer of data with the interface arrangement. The address also includes the category of video device to be controlled, i.e. video cassette recorder or video disc player. Each command sequence from the computer to the interface arrangement includes a start of command byte, one or more command bytes and an end of command byte. Each communication command sequence also includes a video-audio device command byte for selection of desired audio and video modes. The video-audio device command byte in a preferred arrangement also includes a bit of information for designating each type of video device of each video device category. The interface arrangement senses the status of the connected video device and slide projector. The sensed status includes whether or not each of the video device and slide projector is connected and what type of video device is connected. The interface arrangement also senses whether or not the video device is on or off. Further, the interface arrangement monitors the operational mode status of the video device and the slide projector. The interface arrangement responds to status request by the computer to supply the status of each peripheral and the internal status of the interface components. The interface arrangement also communicates various error and status messages including acknowledgement of received command sequences. Error messages are also supplied for error in agreement between the requested peripheral device in the command sequence as compared to the connected peripheral device type. A plurality of the interface arrangements are capable of being controlled by the computer with different addresses being assigned to each of the interface arrangements.

BRIEF DESCRIPTION OF THE DRAWING

The invention both as to its organization and method of operation together with further objects and advantages thereof will best be understood by reference to the following specification taken in conjunction with the accompanying drawings in which.

DESCRIPTION OF THE PREFERRED EMBODIMENT

Figure 1:
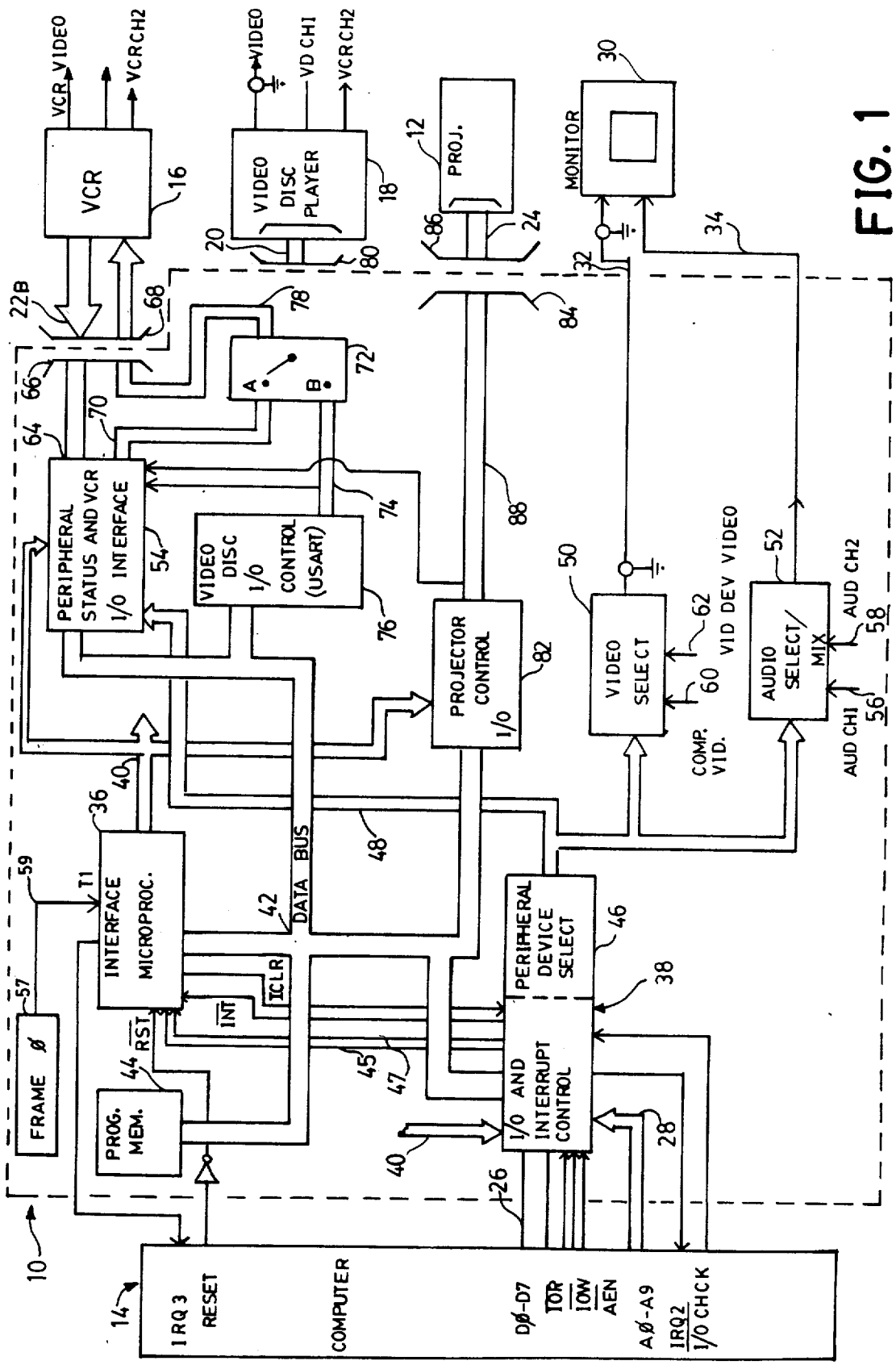
FIG. 1 is a block diagram representation of the interface arrangement of the present invention illustrating the control of various video devices and a random access slide projector in response to a computer.

Referring now to FIG. 1, the interface arrangement 10 of the present invention controls operation of a random access slide projector 12 and either a video cassette recorder (hereinafter VCR) 16 or a video disc player 18 in response to command signals from a computer 14. While video cassette recorders and video disc players are utilized for illustration of video devices, it should be understood that other types of video information storage devices are also contemplated including but not limited to video tape recorders and players. Further, it should also be realized that while a random access slide projector 12 is utilized for illustration, other audio/visual presentation apparatus are also suitable. The video disc player 18 is connected over a bidirectional communication interface 20 to the interface arrangement 10. The VCR 16 is connected to the interface arrangement 10 via multi-conductor control connection 22 including the connections referred to at 22A and 22B. The projector 12 is connected to the interface arrangement 10 over multi-conductor control connection 24.

The interface arrangement 10 communicates with the computer 14 over a data bus 26 and is addressed by address bus 28. The interface arrangement 10 is also interconnected to the computer 14 by control bus connections IRQ2, IRQ3, $\overline{IOR}$, $\overline{IOW}$, $\overline{AEN}$, RESET and $\overline{I/O\ CH\ CK}$. A suitable computer for use as the computer 14 for illustrative purposes is an IBM PC or compatible computer. Similarly for illustrative purposes, a SONY VCR MODEL SLO-323 or PANASONIC VCR MODEL NV-8200 is suitable for the VCR 16. Also for illustrative purposes, a SONY MODEL LDP-1000 or a HITACHI Model VIP-8000 video disc player is suitable for the video disc player 18. In a preferred arrangement, the interface arrangement 10 is provided as an expansion card that is "plugged-in" or connected into an expansion slot of the computer 14.

A system monitor 30 is provided including a video input connected to a monitor video output 32 of the interface arrangement 10 and an audio input connected to a monitor audio output 34 of the interface arrangement 10.

The interface arrangement 10 senses what category of video peripheral device is connected, for example, VCR 16 or video disc player 18 and also what device type of peripheral category is connected, for example VCR type 1 or VCR type 2 corresponding in a specific illustration to SONY SLO-323 for VCR type 1 or PANASONIC NV-8200 for VCR type 2.

The computer 14 issues commands and addresses the interface arrangement in response to user keyboard inputs, program control, etc.

The interface arrangement 10 responds to command and status request messages on the data bus 26 sent by the computer 14 after an appropriate address is presented on address bus 28. The commands include various operational functions of the connected peripheral devices including mode control and execution of predetermined random access selection. In response to a status request, the interface arrangement 10 communicates the status of the various peripheral devices to the computer 14. The interface arrangement 10 after receipt of a command determined to be valid proceeds to execute the command.

The interface arrangement also responds to commands sent by the computer 14 with various predetermined error messages if invalid commands are detected by the interface arrangement. As will be discussed in more detail hereinafter, the error messages are sent to the computer 14 in response to commands with invalid communication protocol or format, commands that select a peripheral of a category or device type that is not connected, etc. The interface arrangement 10 also responds to valid commands by sending an acknowledgement message back to the computer 14. Further, predetermined communication protocol in a preferred embodiment includes multiple byte message format with a predetermined response message for various command bytes as will be explained in more detail hereinafter.

A plurality of the interface arrangements 10 are provided in specific arrangements with individual unique addresses for control by the computer 14. In this regard, different combinations of peripheral devices can be connected to each of the plurality of interface arrangements 10.

The interface arrangement 10 includes an interface microprocessor 36 (referred to as I/F processor 36 hereinafter) for controlling operation of the peripheral devices connected to the interface arrangement 10. The interface arrangement 10 also includes an input/output and interrupt control stage 38 (referred to as I/O-interrupt 38 hereinafter) that is responsive to a predetermined address on address bus 28 and the $\overline{IOW}$ and $\overline{AEN}$ signals to generate an interrupt control signal $\overline{INT}$ to the I/F processor 36. When the computer 14 sends commands or status requests to the interface arrangement 10, a write operation is performed and the computer 14 places the predetermined unique address of the interface arrangement 10 on the address bus 28. In response to the interrupt signal $\overline{INT}$, the I/F processor 36 via signals on a control bus 40 conditions the I/O-interrupt 38 to an input mode to receive data from the data bus 26 of the computer 14. The I/O interrupt 38 places the contents of the data bus 26 on an interface data bus 42 of the I/F processor 36.

After the I/F processor 36 has received a message from the computer 14, the $\overline{INT}$ signal is reset or cleared by the I/F processor 36 sending a control signal ICLR to the I/O-interrupt 38 on the control bus 40.

When the I/F processor 36 is ready to send data to the computer 14, the IRQ3 line to the computer 14 is activated to interrupt the computer 14. In response, the computer 14 performs a read operation of the interface arrangement 10 by placing the unique address of the interface arrangement 10 on the address bus 28 and by the signals $\overline{IOR}$ and $\overline{AEN}$. The I/O-interrupt 38 is conditioned to the output mode to present the data from the data bus 42 of the I/F processor 36 to the data bus 26 of the computer 14.

Figure 2:
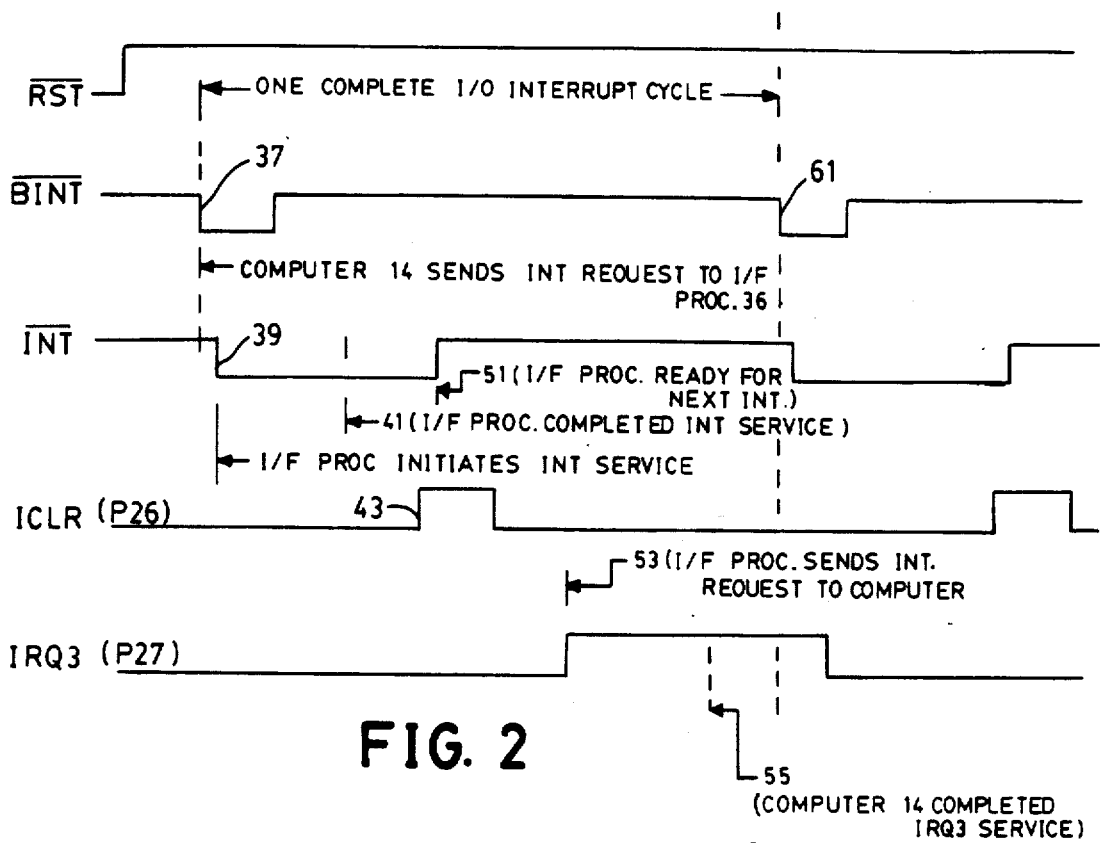
FIG. 2 is a representation with respect to time of control signals and protocol between the interface arrangement and the computer of FIG. 1.

Referring to FIG. 2, the timing of the communication between the computer 14 and the interface arrangement is illustrated. The first waveform $\overline{RST}$, a reset signal to the I/F processor 36 and other portions of the interface arrangement 10, is derived as an inverted signal from the RESET signal from the computer 14. The $\overline{BINT}$ signal is an intermediate signal generated by I/O-interrupt 38 in response to the interrupt request by the computer 14 via the unique address data on the address bus 28 and the $\overline{\text{IOW}}$ and $\overline{\text{AEN}}$ signals. The $\overline{\text{BINT}}$ signal goes low at 37 in response to the interrupt request by the computer 14. In response to the low going $\overline{\text{BINT}}$ signal at 37, the $\overline{\text{INT}}$ signal goes low at 39 and the I/F processor 36 initiates interrupt service.

At time 41 thereafter, the I/F processor 36 has completed the interrupt service and received the data message from the computer 14. The I/F processor 36 at 43 generates the ICLR signal to the I/O-interrupt 38 and in response the $\overline{\text{INT}}$ signal at 51 returns to the high level state so that the I/F processor 36 and the I/O-interrupt 38 are ready for the next interrupt.

When the I/F processor 36 is ready to send data to the computer 14 such as a response acknowledgement to either a portion or complete command message, the I/F processor 36 sets the IRQ3 line high at 53 to interrupt the computer 14 for communication. In response the computer 14 responds to the interrupt at 53 and performs a read operation of the data on the data bus 42 that the I/F processor 36 is sending to the computer 14. At 55, the computer 14 has completed the interrupt service. This completes one I/O-interrupt cycle.

Subsequently at 61, a new I/O-interrupt cycle is started with the computer 14 addressing the I/O-interrupt 38 and the $\overline{\text{BINT}}$ signal going low and the $\overline{\text{INT}}$ signal going low in response thereto.

The interface arrangement includes a program memory 44 that is connected to the data bus 42; the data bus 42 also functioning as an address bus for the program memory 44.

A peripheral device control stage 46 is associated with the I/O-interrupt 38 and provides select control lines 48 in response to the data bus 42 under the control of the I/F processor 36 and the I/O-interrupt 38.

The address bus 28 includes peripheral device select information for each command sequence as well as the address information to identify the unique address of the interface arrangement. The I/O-interrupt 38 includes a device select decoder that outputs device select information lines 45 and 47 to the I/F processor 36. In a preferred arrangement, two of the address bits on bus 28 represent the peripheral device selection code and the lines 45 and 47 are binary coded.

The select control lines 48 are connected to control a video select stage 50, an audio selection and mixer stage 52, and a peripheral status and VCR I/O interface stage 54.

The audio selection and mixer stage 52 includes two peripheral device audio inputs 56 and 58. The audio inputs 56 and 58 are connected to either the audio outputs VCR CH1 and VCR CH2 of the VCR 16 or the audio outputs VD CH1 and VD CH2 of the video disc player 18 dependent upon what type of video device is to be connected to and controlled by the interface arrangement 10.

In a preferred arrangement, the interface arrangement 10 includes a frame-∅ detector 57 accurately detecting a predetermined start point reference of VCR cassette tapes that include a predetermined recorded signal. For example, a VCR cassette tape for use with the interface arrangement 10 is recorded with a 1 KHz signal for example at a reference frame ∅ point at the beginning of the tape. Accordingly, the frame ∅ detector 57 detects the beginning of the 1 KHz signal and provides a change of output state at an output 59. The output 59 is connected to a timing input T1 of the I/F processor 36. The I/F processor 36 in response to the beginning of tape signal received from the stage 54 via the data bus 42 begins to monitor the status of the T1 input. The monitor continues for a predetermined time interval, e.g., 3–5 seconds. When the output 59 changes state, the I/F processor identifies this point as frame ∅ for frame counting reference purposes. The signal is recorded near the beginning of the tape so as to occur within the 3–5 second monitoring interval after the "beginning of tape" signal during play.

The video select stage 50 includes a computer video input 60 and a video device video input 62; the video device video input 62 being connected to either the VCR video output or the video disc video output.

The peripheral status and VCR input/output interface stage 54 in addition to the select control lines 48 also includes a plurality of control lines from the I/F processor control bus 40. The stage 54 includes VCR status, mode and device type sense lines referred to at 64 connected to a video device connector 66. The connector 66 is arranged to interfit with a mating connector 68 of a VCR interface cable to appropriately interconnect the control connection portion 22B of the VCR 16. The lines 64 for example include a control line for each of the following: control track frame pulse signals; tape begin input signal; tape cassette in signal; power-ON sense line; VCR device type 1 sense signal; and VCR device type 2 sense signal. The stage 54 also includes VCR mode control line outputs 70 connected at an A port of an A/B switch arrangement 72. The control line outputs 70 for example include a line for each of the following: rewind mode control; fast forward mode control; three play speed control lines; pause control; and stop control.

The A/B switch 72 includes a B port connected to bidirectional communication interface lines 74. The bidirectional communication interface lines are provided by a video disc I/O control stage 76. The video disc I/O control stage 76 is controlled by the interface data bus 42 and the $\overline{\text{RD}}$ and $\overline{\text{WR}}$ control lines of the control bus 40 of the I/F processor 36. The video disc I/O control stage 76 in a preferred embodiment includes a bidirectional serial communication interface controller in an RS-232 interface format. A multi-conductor line output 78 is connected from an output of the A/B switch 72 to the connector 66. The connector 66 includes a connection arrangement for the output 78 to interconnect matching lines of the connection cable 22A through the mating connector 68. The multi-conductor interface connection 20 provided by an interface multi-conductor cable includes a connector 80 that is arranged to interfit with the connector 66 to appropriately connect the lines of connection 20 to the lines of connection 78.

Accordingly, with the A/B switch in the A position and the VCR 16 connected via connectors 68, the multi-conductor control connections 70 and 64 are interconnected to the respective lines in the connection 22 including respective portions 22A and 22B. Similarly, with the A/B switch in the B position, the interface connection lines 74 are connected via connector 78 and connector 68 to the appropriate lines of connection 20 when connector 80 is connected.

The I/F processor 36 over the data bus 42 receives status information from the video disc player via the lines 74 and sends mode command signals to the video disc player 18 via the lines 74. The various status and mode controls of the video disc player 18, as will be explained in more detail hereinafter, take place in accordance with the predetermined format of the particular video disc player utilized.

The A/B switch in one arrangement is manually operated by the user between the A or VCR position and the B or video disc player position.

In another arrangement, two separate connectors are provided corresponding to connector 66, one for interfitting with the VCR cable connector 68 and one for interfitting with the video disc connector 80; the A/B switch being omitted.

The multi-conductor control connection 24 for the projector 12 is connected to a projector I/O control stage 82. The control connection 24 is provided on a multi-conductor cable with interfitting connection 84 of the interface arrangement 10 and 86 of the cable 24. The connector 84 is connected to the projector I/O control stage 82 via a multi-conductor connection 88. The projector I/O control stage 82 over the connection 88 and cable 24 provides for the inputting of slide number and mode commands to the slide projector 12 and for the sensing of status conditions of the slide projector. The status conditions include representation of signals in the slide projector 12 such as pause, reverse, forward, home position, incremental slide count, tray traveling, 80 or 140 slide tray present, and motor sense. The slide projector 12 in one illustrative example is the RINGMASTER ® MODEL 860A available from Bell and Howell, Chicago, Ill. and as disclosed in U.S. Pat. No. 4,452,518 issued June 5, 1984, which is hereby incorporated by reference for all purposes.

The projector and I/O control stage 82 is controlled by the I/F processor 36 to send data to and receive data from the projector 12.

The bidirectional data is passed over the interface data bus 42 to and from the I/F processor 36. The I/F processor 36 controls the projector I/O control stage 82 over the control bus 40. The control connector 88 as will be explained in more detail hereinafter includes a keyboard signalling interface connection arrangement to provide the input of slide numbers and mode operation to the projector 12 simulating the actuation of the keyboard of the projector.

For example, if the interface arrangement 10 is instructed by the computer 14 to condition the projector 12 to project slide number 53, the I/F processor 36 controls the projector I/O control stage 82 to input the signals to the projector 12 to simulate keyboard actuation of the digits "5", "3", and the "GO TO" keys in sequence. Reference may be made to the aforementioned U.S. Pat. No. 4,452,518 or the RINGMASTER ® MODEL 860-A manual for further discussion of keyboard controls and the entry of data. For the illustrative RINGMASTER ® MODEL 860 A projector, the numbers 0-140 are reserved for slide numbers and the following list is illustrative of examples of the mode codes and corresponding functions:

| CODE | FUNCTION |
|---|---|
| 200 | Auto advance - 5 seconds |
| 201 | Auto advance - 10 seconds |
| 202 | Auto advance - 15 seconds |
| 209 | Remote control enable |
| 211 | Display blank |
| 212 | Display unblank |

Considering now illustrative examples of the command and status messages received by the interface arrangement 10 and the error and status messages interchanged between the interface arrangement and the computer 14, the following TABLE I summarizes examples of the command and status messages received by the interface arrangement 10 and TABLE II summarizes examples of the error/status messages interchanged between the interface arrangement 10 and the computer 14:

TABLE I

| VIDEO DISC PLAYERS | | VCR PLAYERS | | | CODE SENT | CODE |
|---|---|---|---|---|---|---|
| SONY | HITACHI | SONY | PANA | PROJ | HEX | ASCII |
| 0 | 0 | 0 | 0 | 0 | 30H | 0 |
| 1 | 1 | 1 | 1 | 1 | 31H | 1 |
| 2 | 2 | 2 | 2 | 2 | 32H | 2 |
| 3 | 3 | 3 | 3 | 3 | 33H | 3 |
| 4 | 4 | 4 | 4 | 4 | 34H | 4 |
| 5 | 5 | 5 | 5 | 5 | 35H | 5 |
| 6 | 6 | 6 | 6 | 6 | 36H | 6 |
| 7 | 7 | 7 | 7 | 7 | 37H | 7 |
| 8 | 8 | 8 | 8 | 8 | 38H | 8 |
| 9 | 9 | 9 | 9 | 9 | 39H | 9 |
| F PLAY | PLAY | PLAY | PLAY | — | 3AH | : |
| F FAST | FAST FWD | — | X2 | Same as 201 | 3BH | ; |
| F SLOW | SLOW FWD | — | SLOW | Same as 202 | 3CH | < |
| F STEP | — | — | — | FWD 1 | 3DH | = |
| F SCAN | SCAN FWD | FF | FF | Same as 200 | 3EH | > |
| STOP | AUTO PLAY STOP | STOP | STOP | HARD PAUSE ON | 3FH | ? |
| R PLAY | — | — | — | — | 40H | @ |
| R FAST | FAST REV | — | — | — | 41H | A |
| R SLOW | SLOW REV | — | — | — | 42H | B |
| R STEP | — | — | — | REV 1 | 43H | C |
| R SCAN | SCAN REV | REW | REW | — | 44H | D |
| STILL | STILL FWD | PAUSE | PAUSE | CANCEL AUTO ADV | 45H | E |

TABLE I-continued

| VIDEO DISC PLAYERS | | VCR PLAYERS | | | CODE SENT | CODE |
|---|---|---|---|---|---|---|
| SONY | HITACHI | SONY | PANA | PROJ | HEX | ASCII |
| INDEX ON | FRAME TOGGLE | — | — | | 4BH | K |
| INDEX OFF | — | — | — | HARD PAUSE OFF | 4CH | L |
| ENTER | — | RELEASE | RELEASE | GO TO EXEC | 4DH | M |
| — | — | — | — | STATUS | 4EH | N |
| CLEAR | REMOTE | INIT | INIT | HOME | 4FH | O |
| SEARCH | SEARCH | FIND | FIND | — | 5CH | P |
| REPEAT | REPEAT | REPEAT | REPEAT | — | 51H | Q |
| INTERFACE | STATUS | | | | 4AH | J |

TABLE II

ERROR/STATUS MESSAGES FROM INTERFACE PERIPHERALS TO COMPUTER 14

| VIDEO DISC (CATEGORY) | | VCR (CATEGORY) | | | | |
|---|---|---|---|---|---|---|
| TYPE SONY | TYPE HITACHI | TYPE SONY | TYPE PANA | PROJ. | HEX BYTE | ASCII |
| NVLDC | NVLDC | NVLDC | NVLDC | NVLDC | 18H | CAN |
| NAK | INPUT ERROR | | | | 15H | NAK |
| | REJECT 2 | | | | 14H | DC4 |
| | REJECT 1 | | | | 13H | DC3 |
| | UN-SEARCH 2 | | | | 12H | DC2 |
| | UN-SEARCH 1 | | | | 11H | DC1 |
| DEVER (Device error) | DEVER | DEVER | DEVER | | 10H | DLE |
| MABSF (Multiple Audio bit set error flag in 'VDAC' byte) | MABSF | MABSF | MABSF | | 08H | BS |
| ABREF (Audio bit reset flag in 'VDAC' byte) | ABREF | ABREF | ABREF | | 01H | BEL |
| ACK (acknowledge) | ACK | ACK | ACK | | 06H | ACK |
| | LOCAL ERROR | | | | 05H | ENQ |
| ENDBT (end of command byte error) | ENDBT | ENDBT | ENDBT | ENDBT | 03H | ETX |
| SOCER (Start of command byte error) | SOCER | SOCER | SOCER | SOCER | 02H | STX |
| ECOBK (Echo Back) | ECOBK | ECOBK | ECOBK | ECOBK | 7DH | } |

FROM COMPUTER 14 TO INTERFACE 10

| | | | | | | |
|---|---|---|---|---|---|---|
| ECOER (Echo Error) | ECOER | ECOER | ECOER | ECOER | 7EH | |

Considering now the communication protocol from the computer 14 to the interface arrangement 10, as shown by the following illustration, a command sequence includes a start of command byte "SOC", a video-audio device command byte, "VADC" a command byte or bytes "COMD", and an end of command sequence byte "EOC":

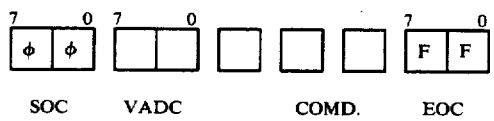

As will be explained in more detail hereinafter in connection with FIG. 2, the command sequence is sent by the computer 14, received by the interface arrangement and acknowledged by the interface arrangement one byte at a time. For example, computer 14 addresses the interface arrangement and sends one byte, e.g. "SOC" byte, the interface arrangement receives the "SOC" byte, and then the I/F processor 36 interrupts the computer 14 to send back an ECOBK echo back response signal as shown in TABLE II. Next the computer 14 addresses the interface arrangement 10 and sends the next byte.

The following are examples of illustrative command sequences:

| 1. PLAY NEXT 1050 FRAMES ON TYPE 1 VCR AT NORMAL SPEED BY SELECTING PERIPHERAL VIDEO AND AUDIO 1 ON: | | | | | |
|---|---|---|---|---|---|
| 00 | 22 | 3A | 30 31 30 35 30 | | FF |
| SOC | VADC | PLAY | 5 DIGITS IN ASCII FORMAT | | EOC |
| 2. SET TYPE 2 VDISC PLAYER IN FORWARD STEP MODE BY SELECTING PERIPHERAL VIDEO WITH BOTH AUDIO CHANNELS OFF: | | | | | |

| -continued | | | |
|---|---|---|---|
| 00 | 09 | 3D | FF |
| SOC | VDAC | STEP | EOC |
| 3. PROJECT SLIDE NUMBER 53 ON PROJECTOR SCREEN | | | |
| 00 VADC | 35 | 33 | 4D FF |
| SOC VDAC REMAINS UNCHANGED FOR PRESENT STATUS | DIG 5 | DIG 3 | GO TO EOC |

Considering the "VADC" byte in more detail, the following illustration is one example of the "VADC" format for the practice of the present invention:

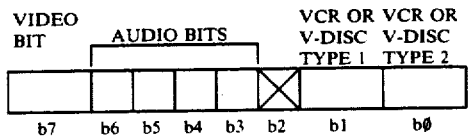

where bit 7 (b7) = video definition bit
  0 = video device video
  1 = computer video bit 2(b2)=X Don't care (available for add'l devices)
bit 3(b3)=1 No audio
bit 4(b4)=1 Audio CH2 ON
bit 5(b5)=1 Audio CH1 ON
bit 6(b6)=1 Audio CH 1 and Audio CH2 simultaneously Note that only one bit in the bits 3, 4, 5 and 6 is a "1" for a particular VADC byte and all the remaining bits of the group will be a "∅". Similarly, bit b∅ will be a "1" for VCR or V-DISC TYPE 2 and bit b1 will be a "1" for VCR or V-DISC TYPE 1. This format provides a method for checking the accuracy of the audio selection bits and the video device type selection bits as will be explained in more detail hereinafter.

Considering the peripheral device selection code on the address bus 28, in a specific embodiment the address bits A∅ and A3–A9 are used for addressing the interface arrangement 10; the address bits A1 and A2 being utilized for representing the device codes. The following is an illustrative example:

| CODE | DEVICE |
|---|---|
| 11 | VCR |
| 10 | VIDEO DISC |
| 01 | PROJECTOR |
| 00 | INTERFACE STATUS |

Considering the interface status device code, this code along with the code 4A in Hexdecimal on the data bus 26 (see TABLE I) is sent by the computer 14 and interpreted by the interface arrangement 10 as an interface status request. In response, the interface arrangement sends back an interface status byte as follows:

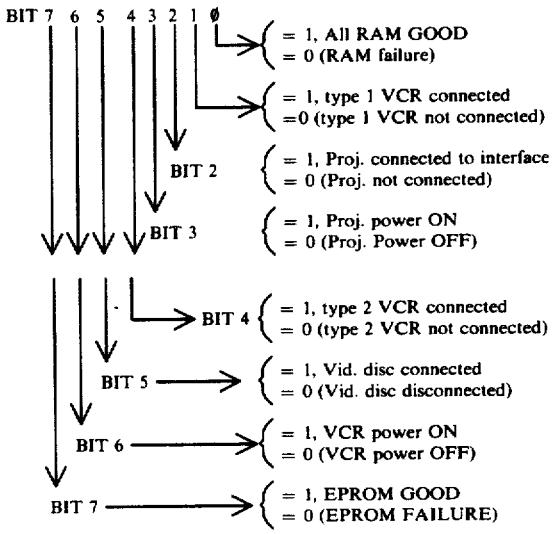

Considering control between the VCR 16 and the interface arrangement 10 where the VCR 16 is not an intelligent device, i.e. no microprocessor control, after the computer 14 sends a command to request a play or search a particular frame or find frame number zero, the I/F processor 36 controls the VCR in normal or fast-forward or rewind mode. The I/F processor 36 then proceeds to detect and count frames and keep track of tape location. During initialization of the frame ∅ reference, the I/F processor 36 detects whether the particular tape inserted includes the predetermined recorded signal burst (1 KHz in a specific example) on audio channel 1. If the tape does not include the signal, the I/F processor counts 100 frames from the beginning of tape signal occurrence and sets that reference point as the zero frame in the frame counter.

The video disc players utilized are typically microprocessor controlled devices. Accordingly, the I/F processor 36 sends a command to the video disc player and receives from the video disc player a response message indicating whether or not the video disc player has executed or is not capable of executing the command. The response is sent to the computer 14 by the I/F processor 36.

The video disc player 18 when executing a command displays the frame number on the monitor 30. The VCR 16 does not have this capability. Accordingly, the I/F processor sends the actual frame count in ASCII code to the computer 14 one digit at a time to inform the computer 14 as to accuracy. In response, the computer 14 is programmed to display the frame number for example if the inaccuracy exceeds a tolerance limit.

Considering now the program operation of the I/F processor 36 and referring to the flow diagram of FIG. 2, program flow starts with the computer being turned on at status block 100 and proceeding to function block 102 to initialize the I/F processor register flags to known values. Program flow then proceeds to a decision block 104 to check if the computer 14 is requesting communications with the I/F processor 36. This determination is determined as discussed hereinbefore by the state of the interrupt signal INT from the I/O interrupt stage 38 in response to the address on address bus 28. If the determination in decision block 104 is YES, program flow proceeds to function block 106 to initiate the interface external interrupt service routine. If the determination in decision block 104 is NO, program flow proceeds back to loop around the decision block 104 until communication is requested by the computer 14.

After function block 106, the program flow proceeds to function block 108 to determine the peripheral device to which the computer 14 desires to communicate. The peripheral device as discussed hereinbefore is determined from the device select code on lines 45 and 47 to the I/F processor 36. The device select codes correspond to VCR, video disc player, projector, or interface status. The program flow then proceeds from function block 108 to function block 110 where the byte sent by the computer 14 to the interface processor 36 is tested. Program flow then proceeds to decision block 112 to determine if the received byte is the first byte "SOC" from computer 14. If the determination is YES, program flow proceeds to determination block 114 to determine if the received byte conforms to the "SOC" byte format. If the determination in decision block 112 is NO, program flow proceeds to determination block 116 to determine if the byte received is the second byte in the communications format.

In decision block 114, if the received byte is in proper format for "SOC", program flow proceeds to function block 118 representing the I/F processor 36 providing the echo response to the computer by interrupting the computer. After function block 118, program flow proceeds back to the decision block 104. If the determination in decision block 114 is NO, then the "SOC" byte format has not been confirmed to be the received byte, then program flow proceeds to function block 120 where the I/F processor 36 requests to communicate and sends "SOCER" error flag to the computer indicating a start of command byte error as shown in TABLE II. From function block 120, the program flow proceeds to function block 122 representing the comment that the computer 14 will start establishing communications all over again after receiving the "SOCER" error and program flow proceeds back to decision block 104.

Figure 3A:
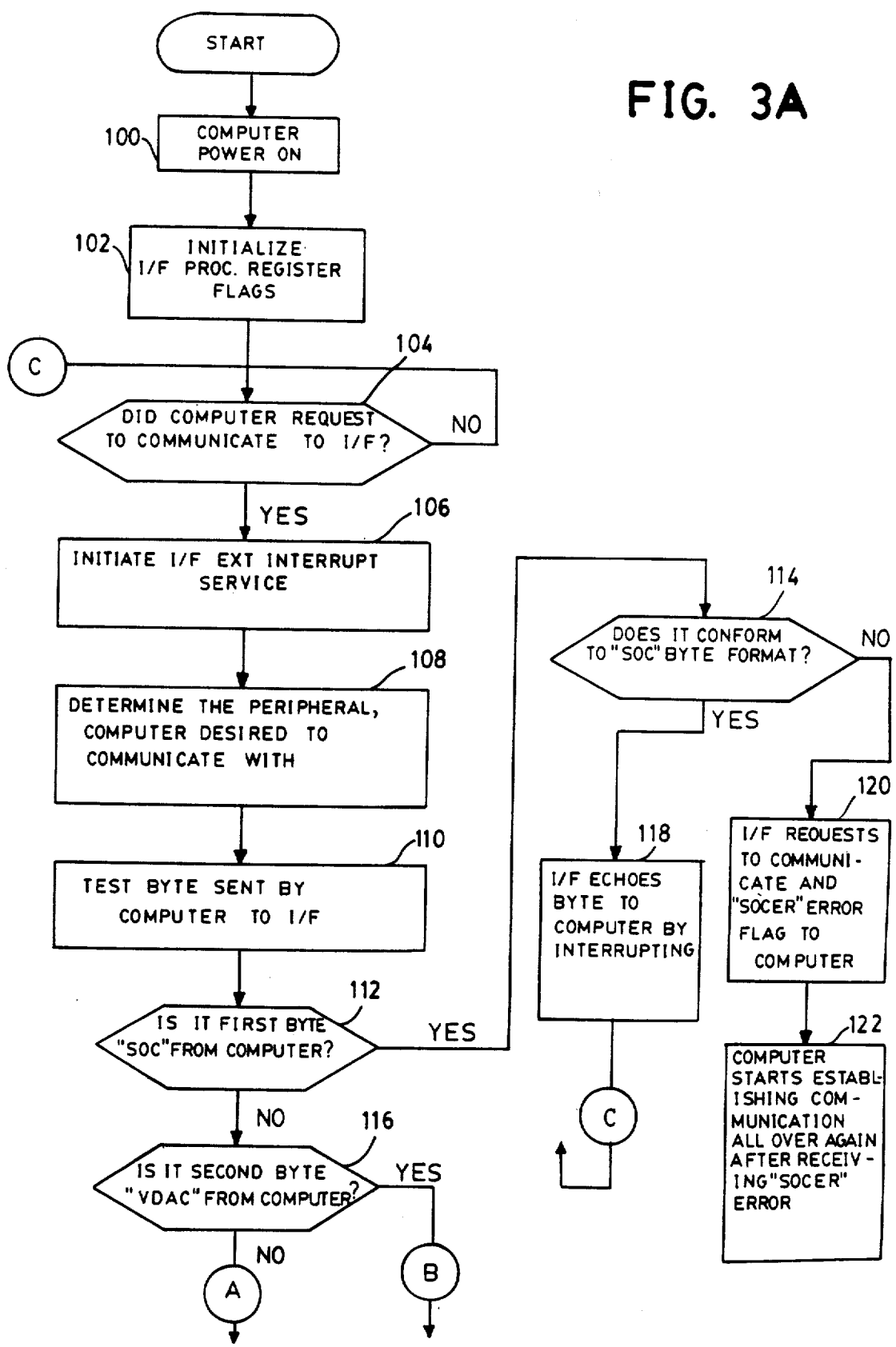
FIGS. 3A–3E are a flow diagram representation illustrating the program flow of operation of the interface arrangement of FIG. 1.
Figure 3B:
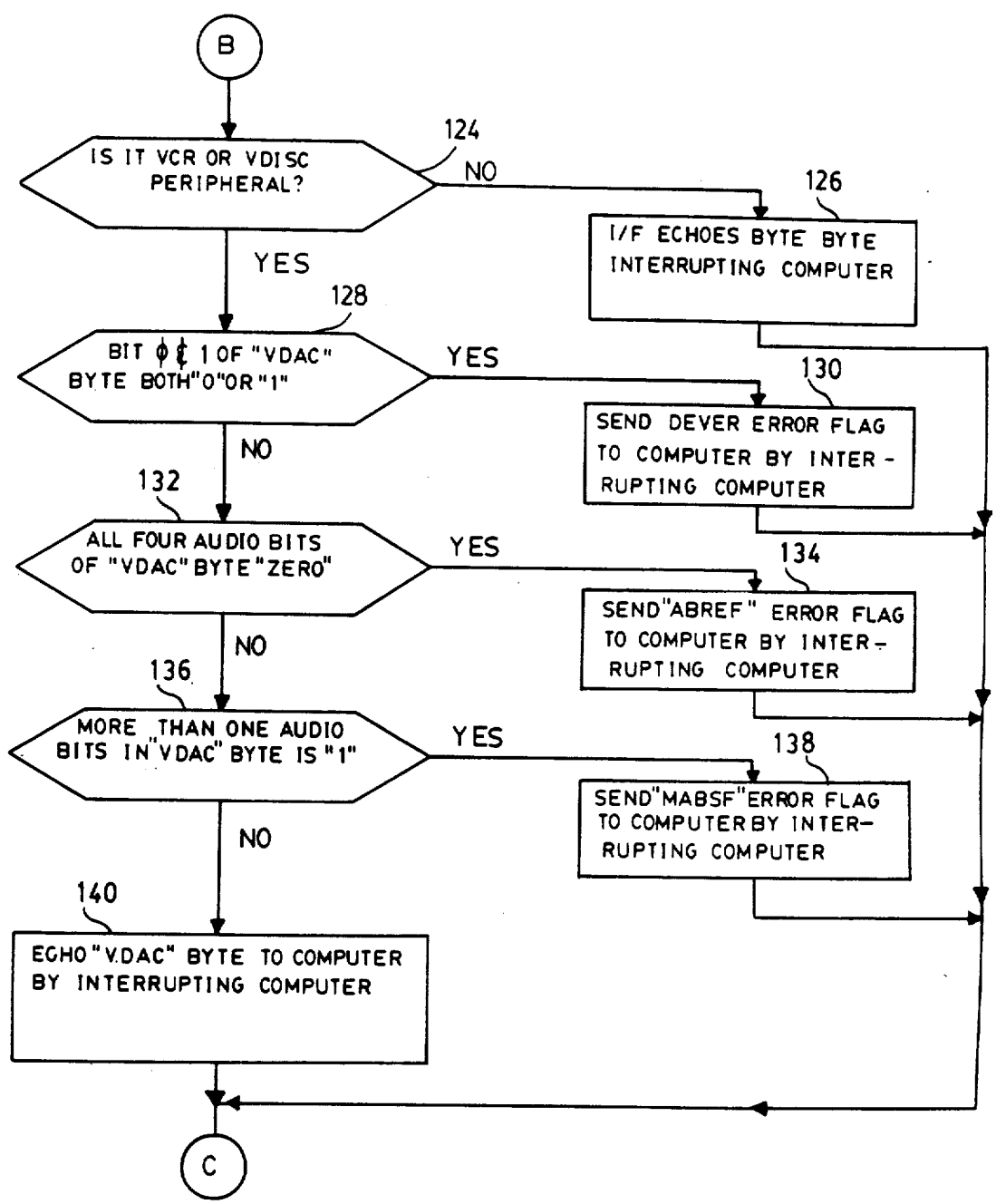

Continuing the program flow from decision block 116 where the received byte is not the "SOC" byte, the determination in block 116 is whether the received byte is the second byte, the "VACD" byte from the computer. If the received byte is the second byte, program flow proceeds to the decision block 124 (FIG. 3B) to check if the device select code on the address bus 28 is for a VCR or video disc peripheral. If the determination is NO, program flow proceeds to function block 126 where the I/F processor echoes the byte by interrupting the computer and proceeds back to decision block 104.

If the determination in decision block 124 is YES, program flow proceeds to decision block 128 to check if bits zero and one of the VDAC byte are both zero or one levels corresponding to set and reset values. If the determination in decision block 128 is YES, the communications protocol has not been conformed to and program flow proceeds to function block 130 to send the device error flag to the computer by interrupting the computer. Program flow then continues back to decision block 104.

If the determination in decision block 128 is NO, program flow proceeds to decision block 132 to test if all four audio bits of the VDAC byte are reset or equal to zero. If the determination in decision block 132 is YES, program flow proceeds to function block 134 to send the ABREF error. Program flow then proceeds back to decision block 104 to again check for computer request for communications. If the determination in decision block 132 is NO, the program flow proceeds to decision block 136 to check if more than one audio bit of the VDAC byte is a one. If the determination in decision block 136 is YES, program flow proceeds to function block 138 to send the MABSF error and program flow proceeds back to decision block 104. If the determination in decision block 136 is NO, then the VDAC byte is in the proper format and program flow proceeds through function block 140 to echo the VDAC byte to the computer and program flow returns to decision block 104.

Figure 3C:
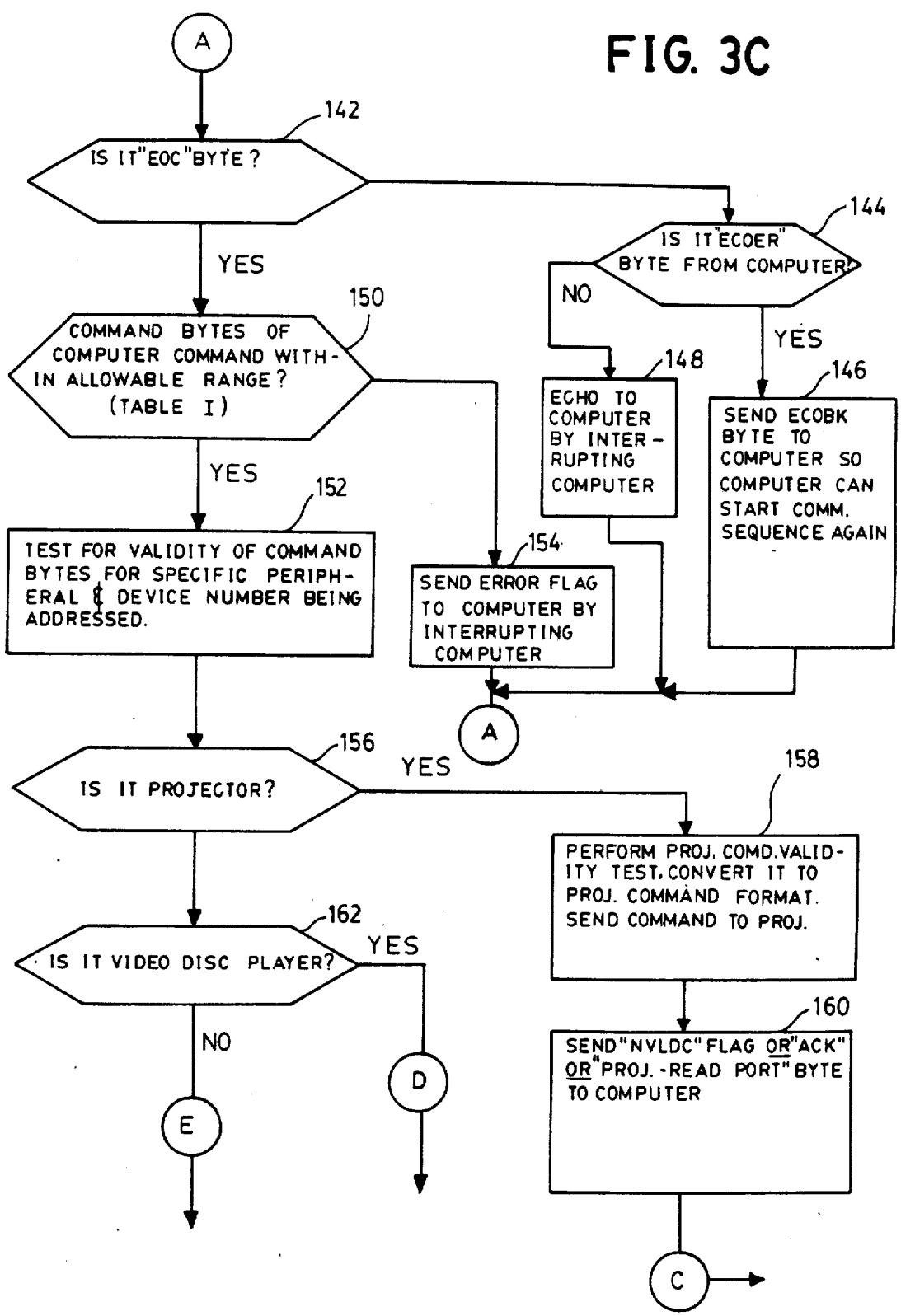

Continuing the program flow again from the NO determination of the decision block 116 corresponding to the byte not being the VDAC byte and referring to FIG. 3C, program flow proceeds to a determination block 142 to check if the received byte is the EOC or end of command byte. If the determination is NO, program flow proceeds to decision block 144 to check if the received byte is an ECOER or echo error byte from the computer. If the determination is YES, program flow proceeds to function block 146 to send the ECOBK byte so the computer can start communication sequence again and then program flow proceeds from block 146 to decision block 104. If the determination in decision block 144 is NO, program flow proceeds to function block 148 representing the I/F processor sending the ECHO message. The program flow then proceeds to the decision block 104.

If the determination in decision block 142 is YES corresponding to a complete command sequence being received, program flow proceeds to decision block 150 to check if the command bytes of the complete commands are within allowable range for the general established limits of communications. If the determination is YES, the program flow proceeds to function block 152 to test for validity of command bytes for the specific peripheral and the device number being addressed. If the determination in the decision block 150 is NO, program flow proceeds to function block 154 to send an error flag to the computer and the program flow then proceeds to the decision block 104.

From function block 152, the program flow proceeds to decision block 156 to check if the command is for the projector. If the determination in decision block 156 is YES, the program flow proceeds to function block 158 to perform the projector command validity test and convert the command to the projector command format and send the command to the projector. Program flow then proceeds from function block 158 to function block 160 to send the NVLDC or ACK or projector read port byte to the computer and program flow then proceeds to decision 104.

Figure 3D:
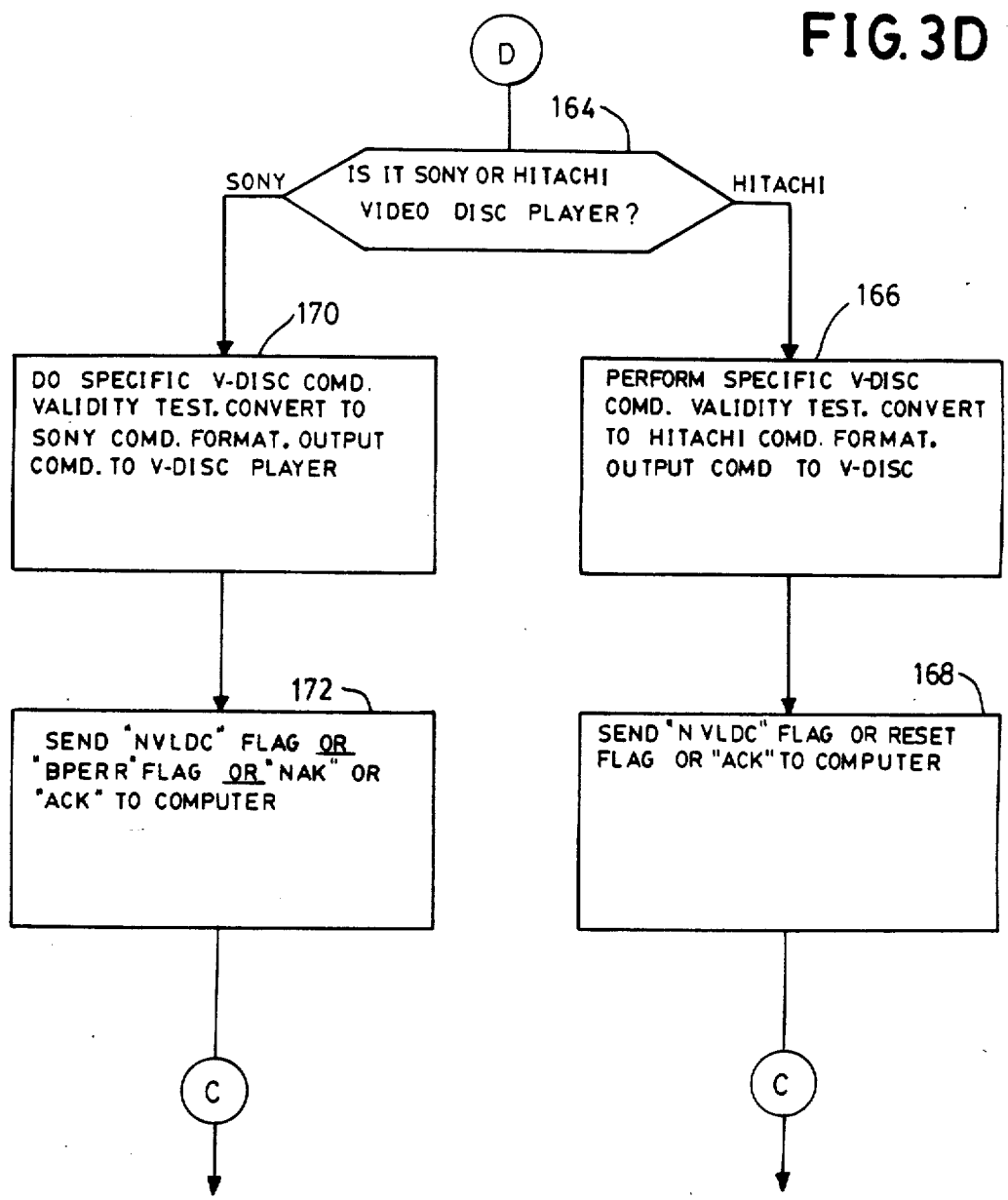

If the determination in decision block 156 is NO that the command byte is not for the projector, the program flow proceeds from decision block 156 to the decision block 162 to check if the command byte is for the video disc player. If the determination is YES for the video disc player in the decision block 162, the program flow proceeds to decision block 164 (FIG. 3D) to check if it is a command for the illustrative SONY or HITACHI video disc player. If the command is for the HITACHI disc player, program flow proceeds to function block 166 to perform the specific command validity test for the HITACHI video disc player, convert to HITACHI command format and output the command to the HITACHI video disc player. Program flow then proceeds from function block 166 to function block 168 to send the NVLDC flag or reject flag or ACK to computer as appropriate and program flow proceeds to decision block 104.

If the determination in decision block 164 is for the SONY video disc player, program flow proceeds to function block 170 to the specific SONY video disc command to perform the validity test, convert to SONY command format, and output the command to the SONY video disc player. Program flow then proceeds to function block 172 to send the NVLDC flag or "BPERR" flag or "NAK" or "ACK" to the computer as appropriate and program flow proceeds to decision block 104.

Figure 3E:
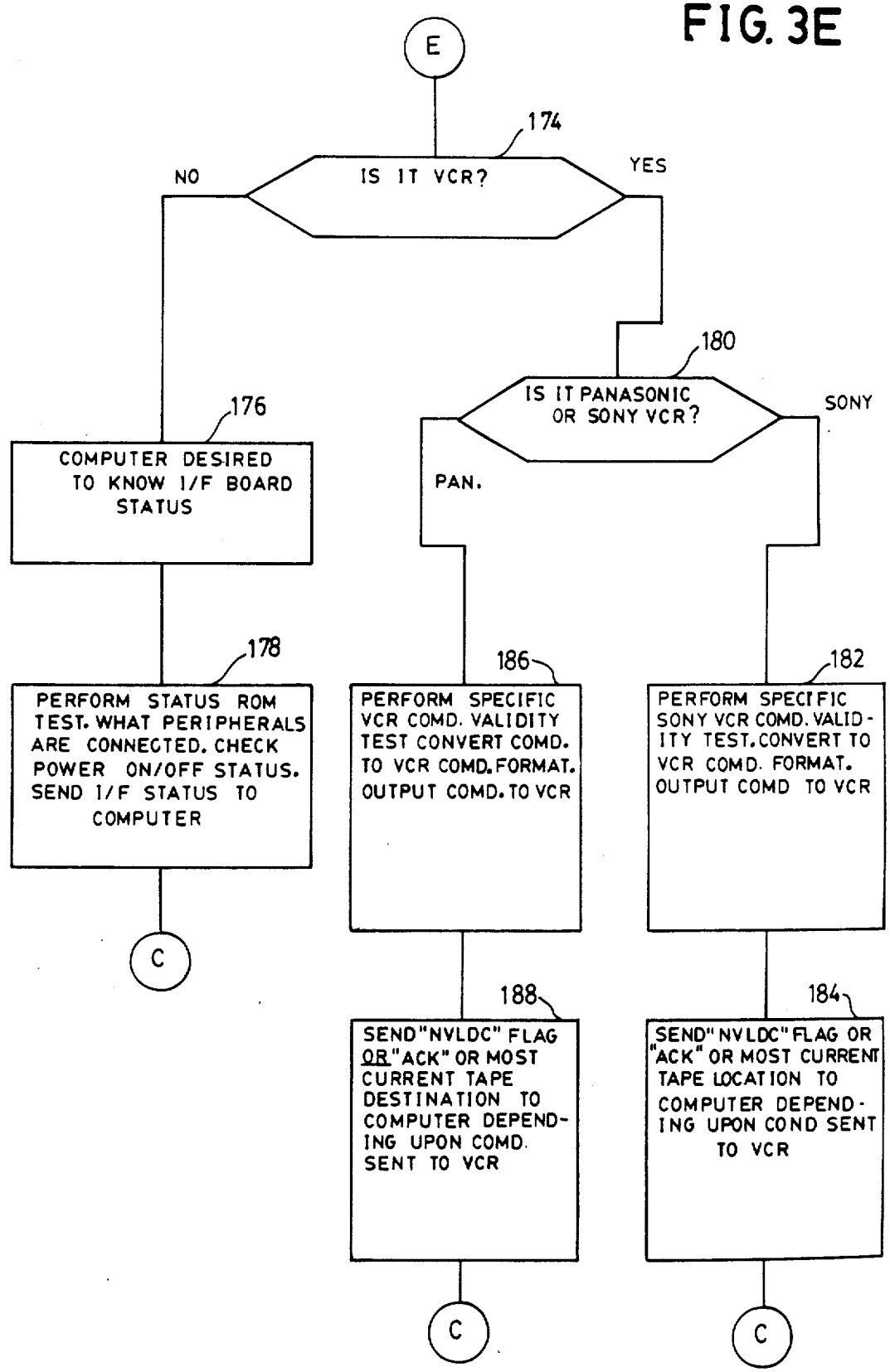
Figure 4A:
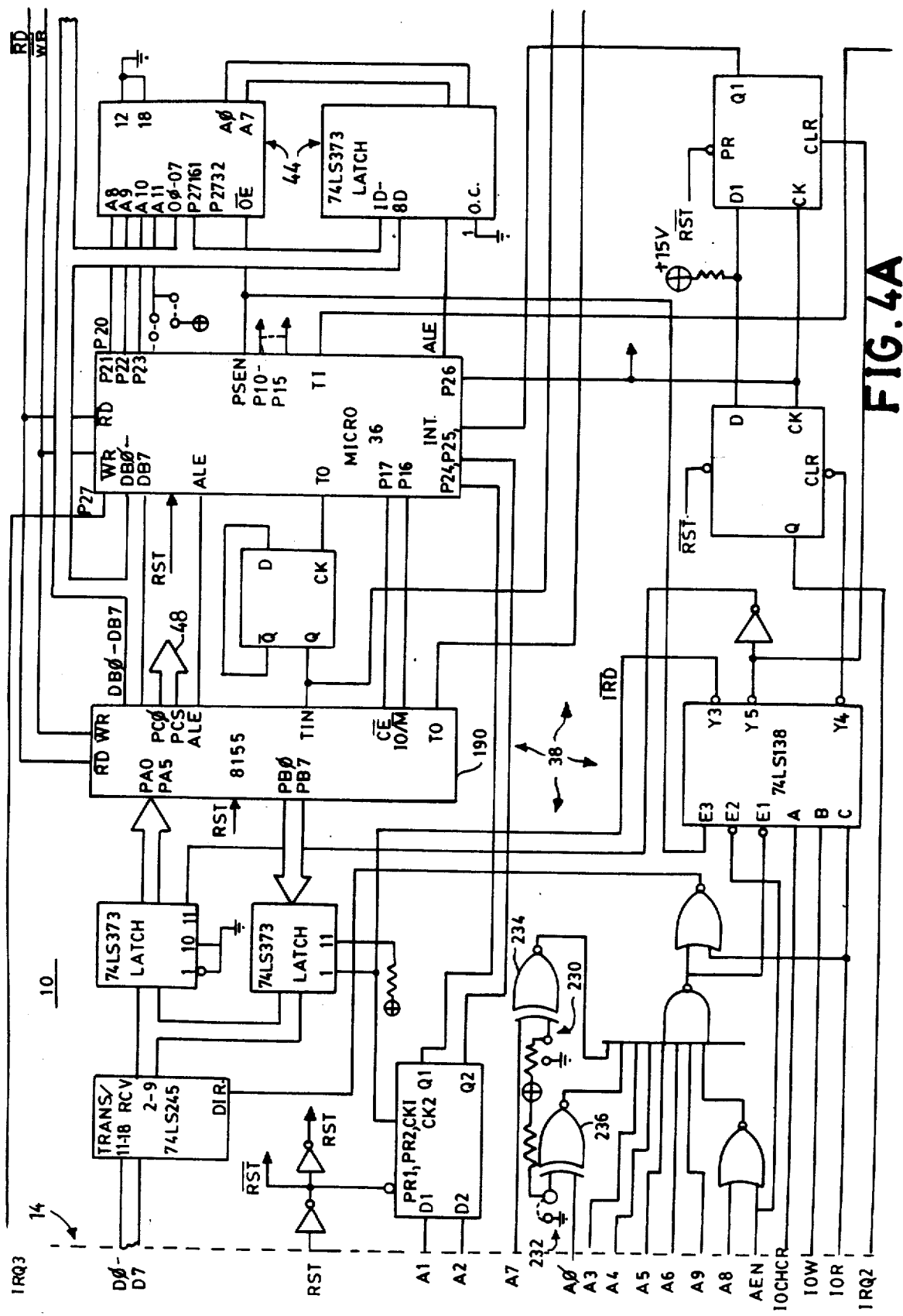
FIGS. 4A–4D when assembled as shown in FIG. 4E are a detailed block, logic and schematic diagram representation of a preferred embodiment of the interface arrangement of FIG. 1.
Figure 4B:
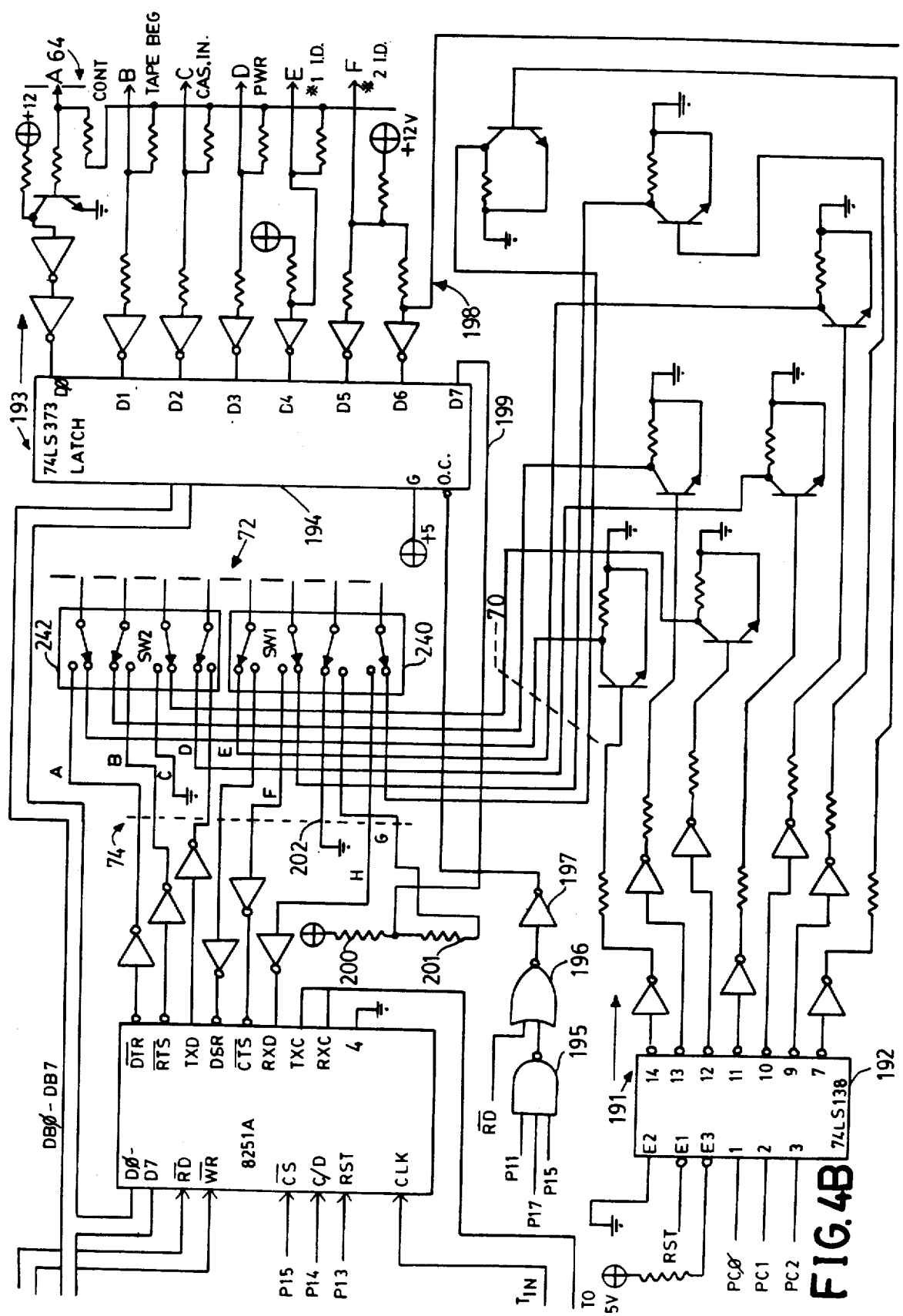
Figure 4C:
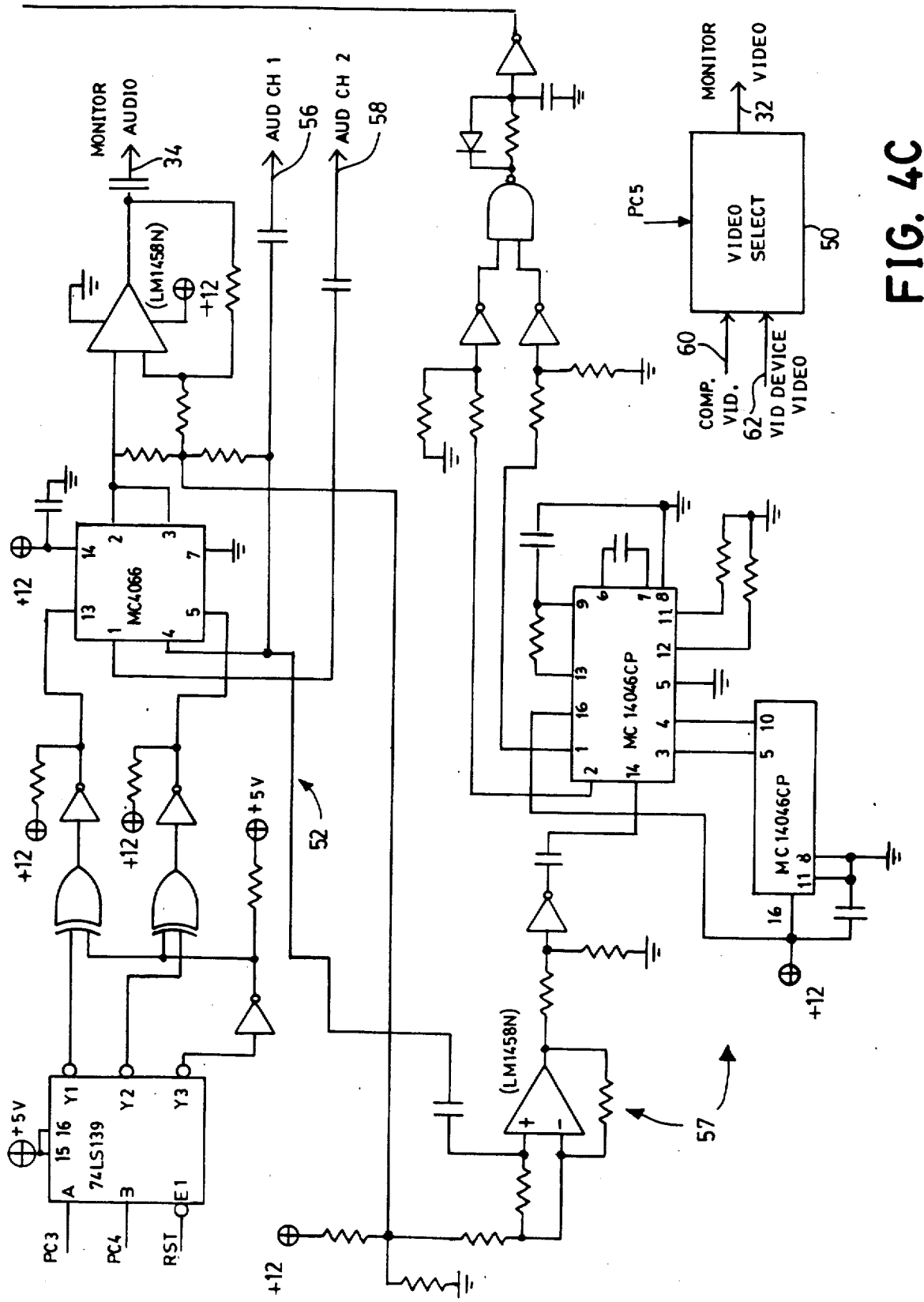
Figures 4D, 4E:
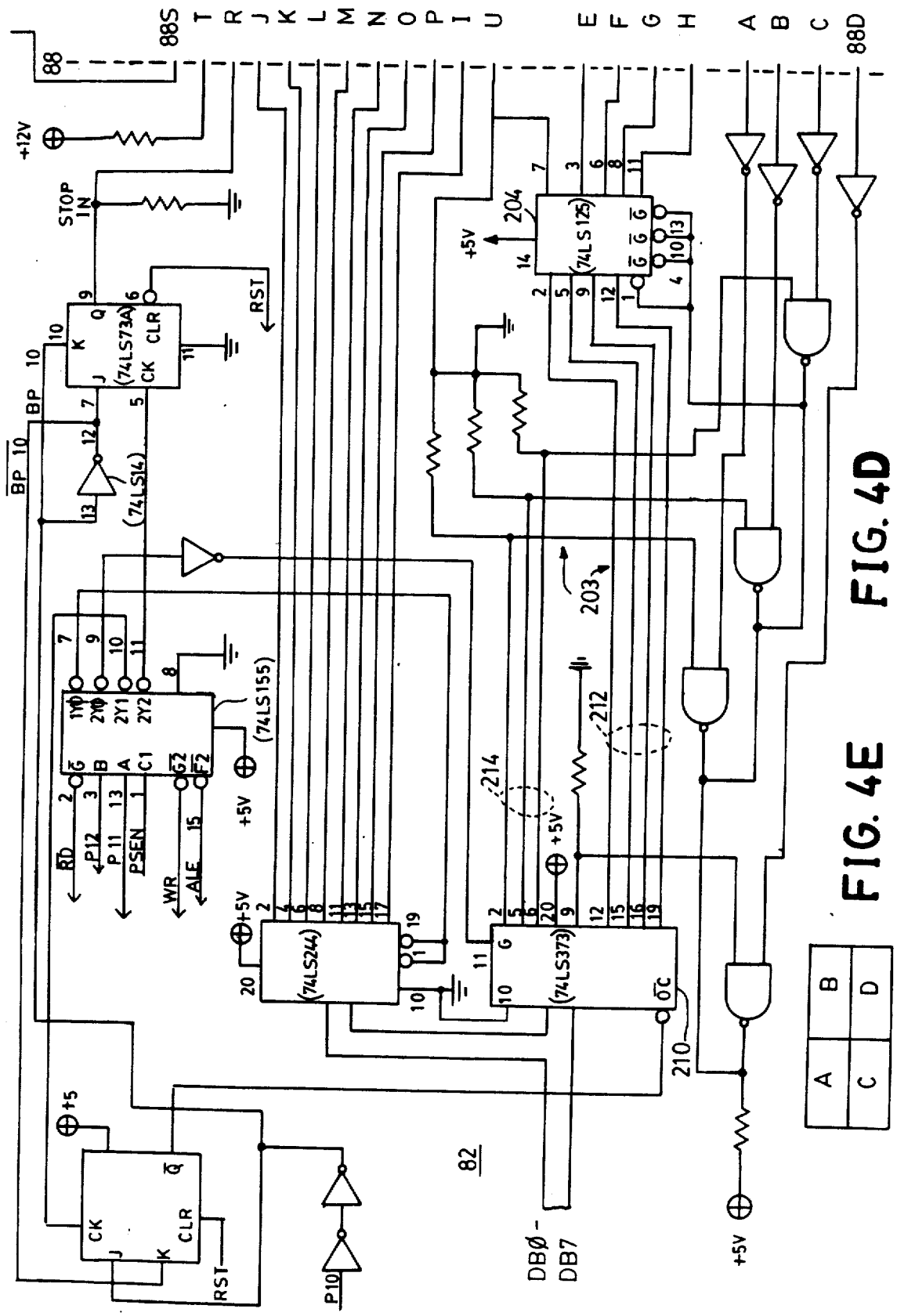

In decision block 162 of FIG. 3C, if the determination is NO, then the command is not for the video disc player and program flow proceeds referring to FIG. 3E to determination block 174 to check if it is for the VCR. If the determination is no, then program flow proceeds to function block 176 representing that the computer has requested status and desires to know the I/F board status. Program flow proceeds to function block 178 to perform the status test to test what peripherals are connected, to check power on and off status, and send status to computer. Program flow then proceeds to decision block 104.

If the determination in decision block 174 is YES that the command is for the VCR, the program flow proceeds to decision block 180 to determine if the VCR command is for the illustrative examples of the Panasonic or SONY VCR. If the command is for the SONY VCR, the program flow proceeds to a function block 182 to perform the specific SONY VCR command test, convert to SONY VCR command format, and output the command to the SONY VCR. From the function block 182, the program flow then proceeds to function block 184 to send the NVLDC flag or ACK message or most current tape location to the computer depending on the command sent to the VCR. Program flow then proceeds to decision block 104.

If the determination in decision block 180 is that the VCR command is for the Panasonic VCR, the program flow proceeds to function block 186 to perform the specific Panasonic VCR command validity test, convert the command to Panasonic command format and output the command to the Panasonic VCR. Program flow then proceeds to function block 188 to send the NVLDC flag or ACK flag or most current tape destination to the computer depending upon the command sent to the VCR. The program flow then proceeds back to decision block 104.

Considering now a specific embodiment of the interface arrangement 10 of FIG. 1 and referring now to FIG. 4, the identical numerals and characters of FIG. 1 are used in FIG. 4 to refer to similar stages, circuitry and integrated circuits. The select control lines 48 are provided by the PC0-PC5 outputs of an I/O expander, timer and external static RAM stage 190 of the I/O-interrupt 38 with peripheral device select stage 46. The PC3 and PC4 lines are connected to control the audio selection and mixer stage 52. The PC5 line is used to control the video select stage 50. The PC0, PC1 and PC2 lines are connected to control the VCR output control portion 191 of the peripheral status and VCR input/output interface stage 54. The I/F processor 36 via multiple bytes over the data bus 42 controls the stage 190 to output a data byte on the control bus 48 at the PC0-5 ports as the device select control signals. The stage 190 is controlled by multiple bytes at the data lines DB0-DB7 to select one of the three bidirectional I/O ports PA, PB, or PC for appropriate data input or output.

The three select control lines PC0, PC1 and PC2 include binary coded representations of the various VCR operational control modes which are decoded by the decoder stage 192 to actuate the appropriate one of the VCR control lines at 70.

The VCR input sense section 193 of the peripheral status and VCR I/O interface stage 54 includes the three control lines P11, P15 and P17 of the control bus 40 of the I/F processor 36. The signals P11, P15 and P17 are utilized along with the $\overline{RD}$ signal to control a latch stage 194 through logic gates 195, 196 and 197. The outputs of the latch 194 are connected to the data bus 42. The inputs to the latch 194 are connected through logic interface circuitry 198 to the VCR input sense lines 64 including control track signal 64A, tape beginning signal 64B, cassette in signal 64C, power sense line 64D, device type 1 identification line 64F. The line 64E of the multi-conductor cable 22B for VCR device type 1 is connected to the VCR ground through the connectors 68 and 66. The VCR ground for VCR device type 2 is connected on the line 64F. The information on lines 64A-64F is presented to the I/F processor 36 on the data bus 42 when the latch stage 194 is enabled for sensing the VCR status. For example, the state of the data bus bit corresponding to the line 64F indicates if a VCR device type 2 is connected to the interface arrangement, the state of the data bus bit corresponding to the line 64E indicates if a VCR device type 1 is connected, and the state of the data bit corresponding to the line 64D indicates whether or not the power is turned on in the connected VCR device. Similarly, the state of the data bus bits corresponding to the lines 64A, B, and C respectively indicate control track pulses, tape beginning signal, and cassette-in information.

One of the lines 88S of the projector I/O control connection 88 is a projector connection indication that is connected to a ground line 88U when a projector 12 is connected via the cable 24 and connectors 84, 86 by a connection between the lines 88S and 88U provided in the projector 12. This projector connection indication line 88S is connected to one of the inputs to the latch 194 to indicate on the corresponding data bus bit whether or not a projector 12 is connected to the interface arrangement.

Another one of the inputs to the latch 194 is connected to a video disc connection indication signal point 199. A first resistor 200 is connected between +5 volts and the point 199 and a second resistor 201 is connected between the point 199 and a return signal ground line 74G of the control connection 74 of the video disc player 18. An interface ground 202 is connected to another line 74C of the control connection 74. The video disc player 18 includes an interconnection between the lines corresponding to 74C and G such that a ground is returned on line 74G via the connectors 66 and 80 and cable 20 when a video disc player 18 is connected.

Accordingly, video disc player connection status is also presented on one of the bits of the data bus 42 when the latch 194 is enabled.

Figure 5:
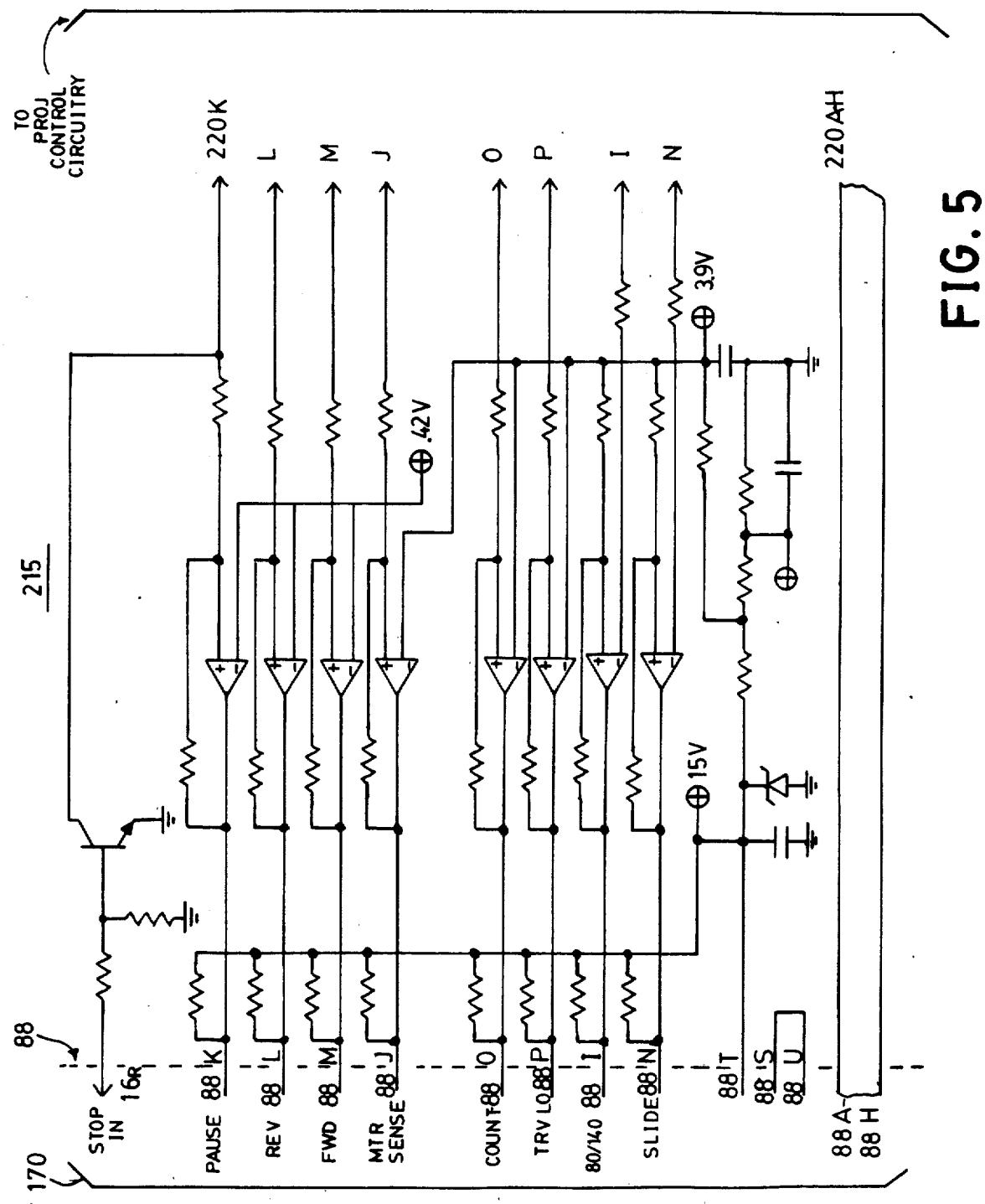
FIG. 5 is a logic and schematic diagram representation of a buffer and level control circuit for the slide projector controlled via the interface arrangement of FIG. 1.

Referring now to FIG. 5, a buffer and level control circuit 215 is shown for appropriately interfacing the projector of the aforementioned U.S. Pat. No. 4,452,518 as projector 12 in FIG. 1 to the projector I/O control stage of FIG. 4 via the control connections 88, 24 and connectors 84 and 86. For example, the control connections 88A-88U are shown at the left of the buffer and level control circuit 215 and the control connections to the projector are shown as 220A-P at the right side of FIG. 5. Referring to FIGS. 1 and 4 of application Ser. No. 336,522, the following table corresponds to the control connections 220A-P to the connection points and signals in the slide projector control apparatus.

| FUNCTIONS | NUMBER | CONNECTION IN U.S. PAT. NO. 4,452,518 |
|---|---|---|
| KEYBOARD | 220A-H | FIG. 1-Keyboard 28, CPU 24 and FIG. 14 (lines 512) |
| MOTOR SENSE | 220J | FIG. 1-Cassette tape control 42 and FIG. 14-557 |
| PAUSE | 220K. | FIG. 1-Casette tape control 42 and FIG. 14-55 |
| REVERSE | 220L | FIGS. 2 and 4 at 52b |
| FORWARD | 220M | FIGS. 2 and 4 at 52a |
| SLIDE 0 | 220N | Home Switch input - at 560 (Fig. 14) |
| COUNT | 220O | FIGS. 1, 2 and 4 - at 100 Slide count |
| TRAVELING | 220P | FIGS. 1, 2 and 4- at 98, FIG. 14 - at 564 |
| 80/140 | 220I | FIG. 6 (460),FIG. 14 - at 558 |

Referring again now to FIG. 4, the interface stage 66 includes a keyboard control arrangement 203. An array of logic gates of the arrangement 203 is connected to the control lines 88A, 88B, 88C and 88D to synchronize the timing of keyboard control signals to the microprocessor of the controlled projector (e.g. lines 512 of the CPU24 in FIG. 14 of application Ser. No. 336,522). When the projector CPU performs a keyboard decode for sensing keyboard inputs, the keyboard array lines connected to 88A, 88B, 88C and 88D are sequentially enabled. When each of the lines 88A-D is enabled, the projector CPU senses the keyboard array lines connected to lines 88E, 88F, 88G, and 88H to detect keyboard actuation and the particular digit that has been actuated for input. The enabled lines 88A, 88B, 88C and 88D through the logic gate array of the keyboard control arrangement 203 enable a latch 204 at inputs 206 at the appropriate time for synchronization with the projector CPU.

When the I/F processor 36 is directed to output a slide number or mode command to the controlled projector 12, the appropriate data is placed on the data bus 42. The data through latch 210 when enabled for output provides the data at 212 to the buffer 204. The data on data bus 42 includes the appropriate row and column data for the keyboard array corresponding to each numerical digit or function key representation to be input to the projector. The data at 212 corresponds to appropriate keyboard array row information for example and the column information on data bus 208 is presented to the logic data array of the keyboard control arrangement 203 on the lines 214 from the latch 210.

Accordingly, if a "1" is to be input to the projector, the data on lines 214 enables the buffer 204 at the enable time of the keyboard row for numeral "1" and the data at 212 provides the enablement of the line for the column of numeral "1". In response, the projector CPU interprets the signal as a keyboard input of numeral "1". For example, the data on bus 42 to place a "1" data bit on line 88E corresponds in one arrangement to column 1 of the projector keyboard. Further the data on bus 42 also includes a "1" bit in the data to enable the gates connected to line 88A to provide a row 1 synchronization signal to the buffer 204. The resulting data on bus 42 in one arrangement is 11100001 for a numeral 1 keyboard simulation to the projector CPU. Thus, when the projector CPU enables the output line for row 1, line 88A provides an enable signal to the buffer 204 to provide an indication at line 88E to the projector CPU representing column 1 actuation during the enablement of row 1. This emulates the actuation of the key "1" on the projector keyboard.

Considering the input of a mode command to the projector, the successive numerals 2, 0, 1 simulated by appropriate operation of the keyboard control arrangement 203 is interpreted by the projector CPU as the command 201 for auto advance at 5 second intervals. For a GO TO slide 53 command, the computer 14 sends the command bytes for "5", "3" and "GO TO", in the command sequence represented by ASCII characters 5, 3, and M to the interface arrangement 10. In response, the I/F processor 36 over data bus 42 controls the projector I/O control 88 and keyboard control arrangement 203 to simulate the keyboard actuation of the "5" key, the "3" key, and the "GO TO" key in sequence at the control connection 88. Reference may be made to the aforementioned application Ser. No. 336,522 for further discussion of keyboard controls and the entry of data.

Of course it should also be realized that other specific arrangements are possible to connect the control connection 88 to the slide projector 12 to practice the present invention.

Referring now to the I/O interrupt stage 38 of FIG. 4, the selection arrangements 230 and 232 along with gates 234 and 236 illustrate a specific implementation of the modification of the unique address of each of a plurality of interface arrangements 10 for control by a single computer 14. The selective connection arrangements 230 and 232 provides a total of four unique address combinations.

Figure 6:
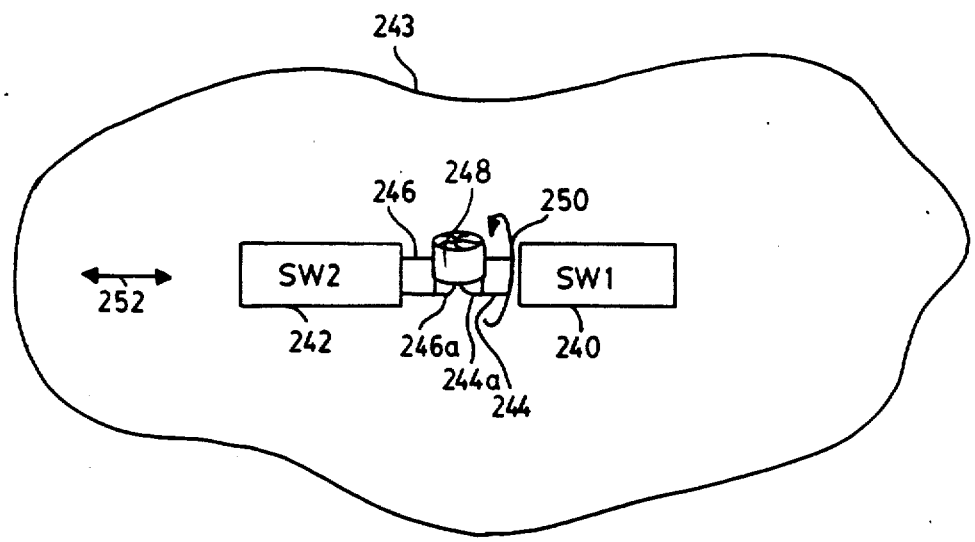
FIG. 6 is a diagrammatic plan view representation of a switch arrangement of the interface arrangement of FIGS. 1–4 for switching a common output connector between the input/output control connections for two categories of video devices.

Referring now additionally to FIG. 6, the A/B selection switch 72 in a specific embodiment is implemented by two identical switches 240 and 242 mounted on a printed circuit expansion card 243 along with the remaining components of the interface arrangement 10. As shown in FIGS. 4 and 6, the two switches 240 and 242 are arranged such that each switch is in the opposite switch state with respect to each other. Each of the switches 240, 242 includes an actuator lever 244, 246 respectively. The actuators 244, 246 are mechanically coupled by a member 248 for simultaneous operation of the switches 240 and 242. In a specific implementation, the member 248 is formed by positioning heat-shrink tubing over the two aligned actuators 244 and 246 at respective portions 244a and 246a the heating the tubing 248 to firmly couple the actuators 244 and 246. Operation of the A/B switch 72 provided by switches 240 and 242 is accomplished by rotation in the direction referred to at 250. In another specific implementation, the switches 240 and 242 are actuated by in/out shifting of the actuators 244 and 246 as indicated by the direction arrow 252 and the actuators 244 and 246 are suitably coupled by a collar or other attachment means.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Control interface apparatus for controlling the operation of a plurality of peripheral devices of different categories including an audio visual presentation device and a video device in response to received signals from a computer of the type separately providing address, control and data signals on address, control and data buses, the video devices capable of being controlled being of at least two different categories including video tape recorders and video disc players, the control interface apparatus comprising:

input/output means coupled to said computer address, control and data buses for receiving address, control and data signals from said computer and for sending data signals to said computer; said input/output means including means responsive to predetermined address signals for generating a request for service signal;

said input/outut means including means responsive to said generating means and predetermined portions of the address signals for identifying the device category to be controlled; and processor means coupled between said input/output means and said plurality of peripheral devices for controlling the operation thereof; said processor means being responsive to said device category identification means and said request for service signal for transferring data signals from said computer data bus to said input/output means; said transferred data signals including command data in a predetermined format, said command data representing a desired function or operation to be performed by one of said peripheral devices, said command data for similar functions and operations of the devices of different categories being identical; and said processor means being responsive to said command data for controlling the operation of said one of said peripheral devices; wherein said command data including an audio/video selection segment and a command code segment; said audio/video selection segment includes a video selection code representing either system video or video device video and an audio code representing either no audio, video device audio one, video device audio two or video device audio one and two mixed; and at least one category of devices to be controlled includes two different device types, said command data including an audio-video-device segment and a command segment; and said audio-video-device segment is one data byte and said command segment includes at least one byte representing a function or mode of a device, predetermined command segments including additional bytes representing location of information of a device.

2. The control interface apparatus of claim 1 wherein said command data including a device type representation, said processor means comprising means responsive to said device type representation for controlling each device type in an appropriate format.

3. The control interface apparatus of claim 2 wherein said processor means comprises means for generating signals in the appropriate device format for controlling said one of said peripheral devices.

4. The control interface apparatus of claim 2 wherein said processor means comprises means for sensing a device type of said one of said peripheral devices.

5. The control interface apparatus of claim 4 wherein said processor means comprises means for comparing said sensed device type with said command data device type representation.

6. The control interface apparatus of claim 2 wherein said command data includes a first command segment representing said device type representation and a second command segment representing said desired function or operation to be performed.

7. The control interface apparatus of claim 1 wherein said predetermined portion of said address signals for identifying the device category includes a status representation code state, said processor means comprising means responsive to said status representation code state and predetermined command data for generating status data representing predetermined status of the control apparatus and said one of said peripheral devices.

8. The control interface apparatus of claim 1 wherein said processor means further comprises means for providing a video monitor output and an audio monitor output in response to a video device video input, two video device audio inputs, a system video input, and audio and video selection signals, said monitor output providing means being responsive to the audio/video selection segment.

9. The control apparatus of claim 1 in combination with at least one additional control interface apparatus, each of said service request generating means being responsive to a different predetermined address signals, said at least two control interface apparatus being responsive to the address data on a common address bus and the command data on a common data bus.

10. The control interface apparatus of claim 9 wherein said service request generating means further comprises selective address setting means for defining said predetermined address of said respective control interface apparatus.

11. The control interface apparatus of claim 1 wherein said command data includes one or more command segments, said processor means further comprising means responsive to each of said command data segments for generating an acknowledgement signal in response to valid segments and for generating an error signal in response to invalid segments.

12. The control interface apparatus of claim 1 wherein said processor means is coupled to said computer and further comprises means for generating control signals for interrupting said computer and for controlling said input/output means for sending said predetermined acknowledgement and error data signals to said computer data bus.

13. The control interface apparatus of claim 1 further comprises a video device control connector having a plurality of control connection conductors, each video device of the different categories being controllable over said video device control connector, said processor means further comprising means for generating video device output control signals on a data bus output, said processor means further comprising category one video device control interface means and category two video device control interface means, each of said category one and category two interface means including means responsive to said video device output signal generating means for providing control signals on said plurality of control connection conductors in appropriate format for the respective device category, said controlling means further comprising switch means for selectively connecting said control connection conductors to either of said category one or category two interface means.

14. The control interface apparatus of claim 13 wherein said switch means comprises two identical switches, each of said switches comprising an actuator for changing the state of the switch said actuator extending from a predetermined portion of said switch, said switches being oriented such that the respective actuators are adjacent to each other, the control apparatus comprising means for coupling said switch actuators in respective positions wherein each switch is in the opposite state to the other.

15. The control interface apparatus of claim 13 wherein category one of the video device is a video tape recorder and category two of the video device in a video disc player, said category two interface means comprising means for providing a serial communication interface and said category one interface means providing a parallel interface.

16. The control interface apparatus of claim 1 wherein at least one of the categories of video devices includes at least two device types, said processor means comprising means for determining which one of said two device types of video devices is connected to said control interface apparatus.

17. Control interface apparatus of claim 1 further comprising:
   means responsive to a beginning of tape signal from a video tape recorder or player for initializing a timing means for determining a predetermined time interval
   means for monitoring one or more audio outputs of the video tape recorder or player for detecting a predetermined audio signal during said predetermined time interval; and
   means responsive to said monitoring means for initializing a reference counter as a frame counting reference in response to said monitoring means detecting said predetermined audio signal.

18. The control interface apparatus of claim 17 wherein said reference initializing means further comprises means responsive to said monitoring means and said beginning of tape signal for establishing a frame reference signal if said predetermined audio signal is not detected during said predetermined time interval, said frame reference signal establishing means comprising means responsive to a control track signal of the video tape player or recorder for counting a predetermined number of frames from the occurrence of the beginning of tape siganl.

* * * * *